(12) United States Patent
Nishimura et al.

(10) Patent No.: US 9,268,034 B2
(45) Date of Patent: Feb. 23, 2016

(54) NUCLEAR REACTOR FUEL INTEGRITY MONITOR

(71) Applicant: MITSUBISHI HEAVY INDUSTRIES, LTD., Tokyo (JP)

(72) Inventors: Takao Nishimura, Tokyo (JP); Kenichiro Kino, Tokai-mura (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/520,887

(22) Filed: Oct. 22, 2014

(65) Prior Publication Data

US 2015/0115157 A1    Apr. 30, 2015

Related U.S. Application Data

(62) Division of application No. 13/814,369, filed as application No. PCT/JP2011/068126 on Aug. 9, 2011.

(30) Foreign Application Priority Data

Aug. 31, 2010    (JP) .................................. 2010-195150

(51) Int. Cl.
*G01T 1/00* (2006.01)
*G01T 1/167* (2006.01)
(Continued)

(52) U.S. Cl.
CPC . *G01T 1/167* (2013.01); *G01T 7/02* (2013.01); *G21C 17/02* (2013.01); *G21C 17/06* (2013.01); *G21C 1/022* (2013.01)

(58) Field of Classification Search
CPC ......... G21C 1/022; G21C 17/02; G21C 19/30

USPC ........................................ 250/370.02, 370.03
See application file for complete search history.

(56) References Cited

U.S. PATENT DOCUMENTS 3,775,245 A     11/1973    Delisle et al.
5,084,235 A  *  1/1992    Ibe et al. ...................... 376/306
(Continued)

FOREIGN PATENT DOCUMENTS

JP     51-021097     2/1976
JP     51-105877     9/1976
(Continued)

OTHER PUBLICATIONS

International Search Report for PCT/JP2011/068126, mailing date of Nov. 15, 2011.
(Continued)

*Primary Examiner* — Mark R Gaworecki
*Assistant Examiner* — Kenneth J Malkowski
(74) *Attorney, Agent, or Firm* — Westerman, Hattori, Daniels & Adrian, LLP

(57) ABSTRACT

A nuclear reactor fuel integrity monitor includes: a γ-ray detector which detects γ-ray of a specific radionuclide of a subject measurement medium of a nuclear reactor; a sample container which retains the subject measurement medium therein and surrounds the circumference of the γ-ray detector; and a measurement control device which performs a control so that a predetermined amount of the subject measurement medium is introduced into the sample container and calculates a concentration of the specific radionuclide from γ-ray data per each unit time detected by the γ-ray detector and a volume of the subject measurement medium introduced into the sample container.

3 Claims, 4 Drawing Sheets

(51) Int. Cl.
*G21C 17/02* (2006.01)
*G01T 7/02* (2006.01)
*G21C 17/06* (2006.01)
*G21C 1/02* (2006.01)

(56) References Cited

U.S. PATENT DOCUMENTS

| | | | |
|---|---|---|---|
| 7,864,914 B2 * | 1/2011 | Ishida et al. | 376/305 |
| 2002/0084420 A1 | 7/2002 | Kitaguchi et al. | |
| 2011/0051881 A1 | 3/2011 | Ahlfeld et al. | |
| 2011/0075785 A1 * | 3/2011 | Nishimura et al. | 376/306 |

FOREIGN PATENT DOCUMENTS

| | | |
|---|---|---|
| JP | 52-129578 | 10/1977 |
| JP | 53-155678 | 12/1978 |
| JP | 60-236079 A | 11/1985 |
| JP | 60-236080 A | 11/1985 |
| JP | 62-006199 A | 1/1987 |
| JP | 62-008084 A | 1/1987 |
| JP | 06-258484 A | 9/1994 |
| JP | 2001-235546 A | 8/2001 |
| JP | 3202397 B2 | 8/2001 |
| JP | 2004-170184 A | 6/2004 |

OTHER PUBLICATIONS

Written Opinion of PCT/JP2011/068126, mailing date of Nov. 15, 2011.

Cited in Japanese Office Action dated Jul. 29, 2014, issued in correponding JP application No. 2010-195150 with English translation (7 pages).

US Non-final Office Action dated Oct. 22, 2014, issued in corresponding U.S. Appl. No. 13/814,369 (8 pages).

US Office Action dated Mar. 19, 2015, issued in U.S. Appl. No. 13/814,369 (11 pages).

Japanese Decision of a Patent Grant dated Mar. 3, 2015, issued in corresponding JP Patent Application No. 2010-195150 with English translation (4 pages).

* cited by examiner

NUCLEAR REACTOR FUEL INTEGRITY MONITOR

CROSS-REFERENCE TO RELATED APPLICATIONS

This application is a Divisional of U.S. application Ser. No. 13/814,369, filed Feb. 5, 2013, and wherein application Ser. No. 13/814,369 is a national stage application filed under 35 USC §371 of International Application No. PCT/JP2011/068126, filed Aug. 9, 2011, and which is based upon and claims the benefit of priority from the prior Japanese Patent Application No. 2010-195150, filed on Aug. 31, 2010, the entire contents of which are incorporated herein by reference.

FIELD

The present invention relates to a nuclear reactor fuel integrity monitor which monitors a nuclear reactor fuel state.

BACKGROUND

For example, a pressurized water reactor (PWR) or a boiling water reactor (BWR) uses light water as a nuclear reactor coolant and a neutron moderator. In a normal operation mode of the nuclear reactor, the nuclear reactor coolant cools a cladding pipe of nuclear reactor fuel so as to decrease the temperature of the cladding pipe.

In order to check the integrity of the nuclear reactor fuel when operating the nuclear reactor in the normal mode, a nuclear reactor coolant and a gas dissolved in the nuclear reactor coolant are periodically sampled from the nuclear reactor. Then, a concentration of a specific radionuclide which may be discharged from the nuclear reactor fuel to the nuclear reactor coolant and the dissolved gas is monitored.

For example, Patent Literature 1 discloses a radioactive gas measuring device which extracts the gas dissolved in the nuclear reactor coolant, seals the gas in a sample chamber, and monitors a radiation level of a radioactive gas.

CITATION LIST

Patent Literature

Patent Literature 1: Japanese Patent Application Laid-open No. 2001-235546

SUMMARY

Technical Problem

However, in the operation in which the gas dissolved in the nuclear reactor coolant is extracted, is sealed in the sample chamber, and is measured by the radioactive gas measuring device, some time is necessary for extracting the dissolved gas. Further, the operation of sealing the dissolved gas in the sample chamber is an operation which needs an operator's labor.

The invention is made in view of such circumstances, and it is an object of the invention to provide a nuclear reactor fuel integrity monitor capable of periodically sampling a coolant or a dissolved gas of a nuclear reactor from a sampling point without an operator's labor and measuring a concentration of a specific radionuclide included in the coolant or the dissolved gas of the nuclear reactor.

Solution to Problem

In order to solve the above-described problems and attain the object, according to an aspect of the invention, there is provided a nuclear reactor fuel integrity monitor including: a γ-ray detector which detects γ-ray of a specific radionuclide of a subject measurement medium of a nuclear reactor; a sample container which retains the subject measurement medium therein and surrounds the circumference of the γ-ray detector; and a measurement control device which performs a control so that a predetermined amount of the subject measurement medium is introduced into the sample container and calculates a concentration of the specific radionuclide from γ-ray data per each unit time detected by the γ-ray detector and a volume of the subject measurement medium introduced into the sample container.

Since the sample container is formed in a shape in which the subject measurement medium surrounds the γ-ray detector, it is possible to increase the volume of the subject measurement medium which may be detected by the γ-ray detector. As a result, since the amount of the γ-ray which may be detected by the γ-ray detector 31 increases, there is no need to perform the operation of concentrating the subject measurement medium so as to improve the detection efficiency of the γ-ray detector 31. Further, since the supply of the subject measurement medium is controlled so that a predetermined amount of the subject measurement medium is introduced into the sample container, it is possible to periodically measure the γ-ray of the subject measurement medium introduced into the sample container without the operator's labor. Further, according to the invention, it is possible to calculate the concentration for each specific radionuclide.

As a desirable aspect of the invention, the sample container may be formed in a hollow shape and be wound on the γ-ray detector so as to surround the γ-ray detector in a spiral shape.

Since the sample container is formed in a hollow shape, it is possible to efficiently discharge the subject measurement medium inside the sample container without leaving the subject measurement medium therein. Further, since the sample container is wound on the γ-ray detector so as to surround the γ-ray detector in a spiral shape, it is possible to increase the volume of the subject measurement medium which may be detected by the γ-ray detector. As a result, it is possible to ensure the detection output of the γ-ray detector.

As a desirable aspect of the invention, the subject measurement medium may be a gas and the specific radionuclide may be radioxenon. When the radioxenon is discharged from the nuclear reactor fuel, it is possible to generate an alarm at an early timing.

Advantageously, in the nuclear reactor fuel integrity monitor, the sample container includes a recess portion and the γ-ray detector is disposed in the recess portion. Accordingly, the subject measurement medium surrounds the circumference of the γ-ray detector and the amount of the γ-ray which is received by the γ-ray detector from the subject measurement medium increases.

Advantageously, in the nuclear reactor fuel integrity monitor, the subject measurement medium is a coolant of the nuclear reactor and the specific radionuclide is radioactive iodine. When the radioactive iodine is discharged from the nuclear reactor fuel, it is possible to generate an alarm at an early timing.

Advantageously, in the nuclear reactor fuel integrity monitor, an inlet side of the sample container is provided with an activated alumina column, and the coolant passing through the activated alumina column is introduced into the sample container. Even when the coolant of the nuclear reactor is periodically sampled without the operator's labor, the radioactive fluorine as the hindering nuclide is not supplied to the γ-ray detector while being mixed with the radioactive iodine.

Then, the radioactive iodine is measured by the γ-ray detector without the interference of the radioactive fluorine.

According to another aspect of the present invention, a nuclear reactor fuel integrity monitor includes: a first γ-ray detector which detects γ-ray of a first specific radionuclide contained in a gas as a subject measurement medium of a nuclear reactor; a first sample container which retains the gas inside a hollow portion thereof and is wound on the first γ-ray detector so as to surround the first γ-ray detector in a spiral shape; a second γ-ray detector which detects γ-ray of a second specific radionuclide contained in a coolant as a subject measurement medium of the nuclear reactor; a second sample container which retains the coolant therein and includes a recess portion for disposing the second γ-ray detector therein; and a measurement control device which performs a control so that a predetermined amount of the gas is introduced into the first sample container and a predetermined amount of the coolant is introduced into the second sample container, and calculates concentrations of the first and second specific radionuclides from γ-ray data per unit time detected by the first and second γ-ray detectors and volumes of the subject measurement mediums introduced into the first and second sample containers. According to the invention, it is possible to monitor the specific radionuclide of the nuclear reactor fuel by both the gas and the cooling water. As a result, it is possible to recognize the nuclear reactor fuel state over again.

Advantageous Effects of Invention

According to the invention, the coolant or the dissolved gas of the nuclear reactor is periodically sampled without the operator's labor, and hence the concentration of the specific radionuclide included in the coolant or the dissolved gas may be measured.

DESCRIPTION OF EMBODIMENTS

Figure 1:
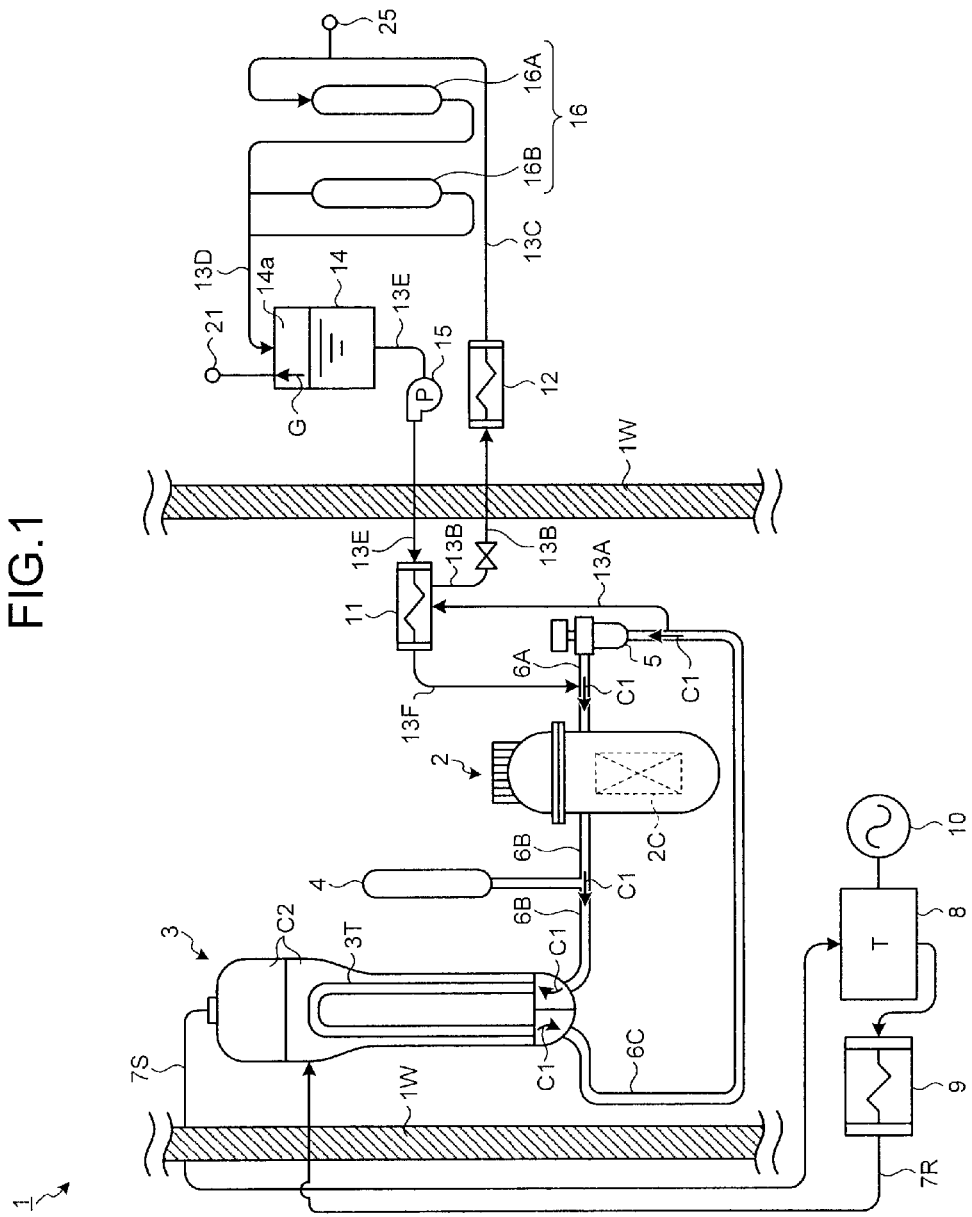
FIG. 1 is a schematic diagram illustrating a nuclear plant.

A mode for carrying out the invention (an embodiment) will be described in detail by referring to the drawings. The invention is not limited to the content described in the embodiment below. Further, the constituents described below include a constituent that may be easily supposed by the person skilled in the art and a constituent that has substantially the same configuration. Further, the constituents described blow may be appropriately combined with one another.

(First Embodiment)
FIG. 1 is a schematic diagram illustrating a nuclear plant. In the embodiment, a nuclear plant 1 is a nuclear generation facility. A nuclear reactor 2 which constitutes the nuclear plant 1 is a pressurized water reactor.

In the nuclear plant 1, the nuclear reactor 2, a steam generator 3, a pressurizer 4, a nuclear reactor coolant pump 5, and a regeneration heat exchanger 11 are arranged inside a containment 1W. Further, a turbine 8, a condenser 9, and a power generator 10 are arranged outside the containment 1W. In the nuclear reactor 2, a nuclear reactor fuel 2C is disposed inside a pressure container. Further, a nuclear reactor coolant (which corresponds to cooling water, for example, light water) C1 is charged into the pressure container. The nuclear reactor coolant pump 5 is connected to the nuclear reactor 2 by a first nuclear reactor coolant supply passageway 6A, and the nuclear reactor 2 is connected to the steam generator 3 by a second nuclear reactor coolant supply passageway 6B. Further, the steam generator 3 is connected to the nuclear reactor coolant pump 5 by a nuclear reactor coolant collecting passageway 6C.

The nuclear reactor coolant C1 which is ejected from the nuclear reactor coolant pump 5 passes through the first nuclear reactor coolant supply passageway 6A so as to be supplied into the pressure container of the nuclear reactor 2. Then, the nuclear reactor coolant C1 is heated by the thermal energy which is generated by the nuclear fission reaction of the nuclear reactor fuel 2C disposed inside the pressure container. The heated nuclear reactor coolant C1 passes through the second nuclear reactor coolant supply passageway 6B so as to be supplied to the steam generator 3. Then, the nuclear reactor coolant C1 passes through a heat transfer pipe 3T of the steam generator 3, flows out of the steam generator 3, passes through the nuclear reactor coolant collecting passageway 6C, returns to the nuclear reactor coolant pump 5, and is ejected again from the first nuclear reactor coolant supply passageway 6A into the pressure container of the nuclear reactor 2.

The steam generator 3 includes a plurality of the heat transfer pipes 3T, and a secondary coolant C2 outside the heat transfer pipe 3T is heated and boiled by the nuclear reactor coolant C1 which flows inside the heat transfer pipe 3T, so that pressurized hot steam of the secondary coolant C2 is generated. The steam generator 3 is connected to the turbine 8 by a steam supply passageway 7S, and the condenser 9 is connected to the steam generator 3 by a secondary coolant collecting passageway 7R. Accordingly, the pressurized hot steam of the secondary coolant C2 which is generated by the steam generator 3 passes through the steam supply passageway 7S so as to be supplied to the turbine 8, thereby driving the turbine 8. Then, power is generated by the power generator 10 which is connected to the driving shaft of the turbine 8. The secondary coolant C2 which is used to drive the turbine 8 is liquefied by the condenser 9, and passes through the secondary coolant collecting passageway 7R so as to be sent to the steam generator 3 again.

The nuclear reactor 2 is a pressurized water reactor, and the pressurizer 4 is connected to the second nuclear reactor coolant supply passageway 6B. Then, the pressurizer 4 pressurizes the nuclear reactor coolant C1 inside the second nuclear reactor coolant supply passageway 6B. With such a structure, the nuclear reactor coolant C1 is not boiled even when the coolant is heated by the thermal energy generated by the nuclear fission reaction of the nuclear reactor fuel 2C, and circulates the nuclear reactor 2 and the cooling system thereof in a liquid state. Here, the cooling system of the nuclear reactor 2 is a system which includes the nuclear reactor coolant pump 5, the first nuclear reactor coolant supply passageway 6A, the second nuclear reactor coolant supply passageway 6B, the steam generator 3, and the nuclear reactor coolant collecting passageway 6C and through which the nuclear reactor coolant C1 flows.

In order to eliminate impurities included in the nuclear reactor coolant C1, a desalination tower 16 is installed. The desalination tower 16 includes a first desalination tower 16A and a second desalination tower 16B, and is installed outside the containment 1W. The first desalination tower 16A is a coolant hot-bed desalination tower, and the second desalination tower 16B is a coolant cation desalination tower. The nuclear reactor coolant C1 which is extracted from the inlet side (the upstream side) of the nuclear reactor coolant pump 5 is supplied from the cooling system of the nuclear reactor 2 to the desalination tower 16 so that a desalination process is performed thereon, and the nuclear reactor coolant C1 returns to the outlet side (the downstream side) of the nuclear reactor coolant pump 5.

A desalination process system of the nuclear reactor coolant C1 includes a nuclear reactor coolant extracting passageway 13A, the regeneration heat exchanger 11, a nuclear reactor coolant passageway 13B, a non-regeneration heat exchanger 12, a nuclear reactor coolant passageway 13C, the desalination tower 16, a nuclear reactor coolant passageway 13D, a volume control tank 14, and nuclear reactor coolant returning passageways 13E and 13F. The nuclear reactor coolant extracting passageway 13A connects the nuclear reactor coolant collecting passageway 6C constituting the cooling system of the nuclear reactor 2 to the regeneration heat exchanger 11. The regeneration heat exchanger 11 is connected to the non-regeneration heat exchanger 12 by the nuclear reactor coolant passageway 13B, and the non-regeneration heat exchanger 12 is connected to the desalination tower 16 by the nuclear reactor coolant passageway 13C.

The desalination tower 16 is connected to the volume control tank 14 by the nuclear reactor coolant passageway 13D, and the volume control tank 14 is connected to the regeneration heat exchanger 11 by the nuclear reactor coolant returning passageway 13E. Further, the regeneration heat exchanger 11 is connected to the first nuclear reactor coolant supply passageway 6A by the nuclear reactor coolant returning passageway 13F. The nuclear reactor coolant returning passageway 13E is provided with a charging pump 15.

The nuclear reactor coolant C1 is extracted from the nuclear reactor coolant extracting passageway 13A, that is, the inlet side (the upstream side) of the nuclear reactor coolant pump 5. The nuclear reactor coolant C1 which is extracted from the cooling system of the nuclear reactor 2 is guided to the regeneration heat exchanger 11, and passes through the nuclear reactor coolant passageway 13B, the non-regeneration heat exchanger 12, and the nuclear reactor coolant passageway 13C so as to be guided to the desalination tower 16, where the desalination process is performed. The nuclear reactor coolant C1 subjected to the desalination process passes through the nuclear reactor coolant passageway 13D and is temporarily accumulated in the volume control tank 14. Then, the nuclear reactor coolant is sent to the regeneration heat exchanger 11 by the charging pump 15 which is installed in the nuclear reactor coolant returning passageway 13E. The nuclear reactor coolant C1 which passes by the regeneration heat exchanger 11 passes through the nuclear reactor coolant returning passageway 13F so as to be returned to the first nuclear reactor coolant supply passageway 6A, that is, the outlet side (the downstream side) of the nuclear reactor coolant pump 5.

The nuclear reactor coolant C1 inside the volume control tank 14 is separated into a liquid phase and a gas phase, and a gas phase portion 14a including a gas G exists along with the nuclear reactor coolant C1. Then, the volume control tank 14 is provided with a gas phase sampling point 21 which may sample a part of the gas G of the gas phase portion 14a as the dissolved gas. The installation of the gas phase sampling point 21 is not limited to the volume control tank 14 as long as there is a tank which has the nuclear reactor coolant C1 therein and in which the nuclear reactor coolant exists while being separated into a liquid phase and a gas phase. The nuclear reactor coolant passageway 13C which constitutes the desalination process system of the nuclear reactor coolant C1 is provided with a nuclear reactor coolant sampling point 25 which may sample a part of the nuclear reactor coolant C1. Furthermore, the installation of the nuclear reactor coolant sampling point 25 is not limited to the nuclear reactor coolant passageway 13C.

Figure 2:
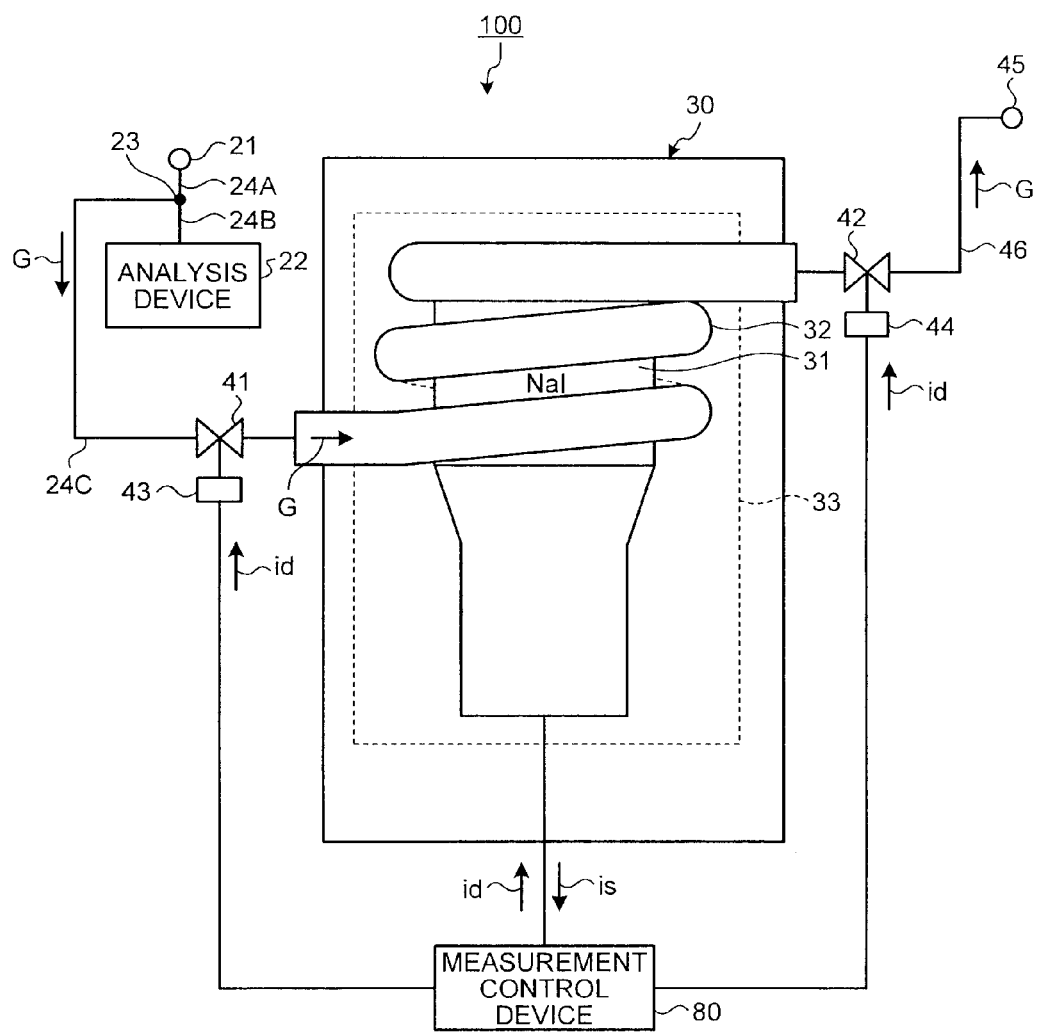
FIG. 2 is a schematic diagram illustrating an example of a nuclear reactor fuel integrity monitor according to a first embodiment.
Figure 3:
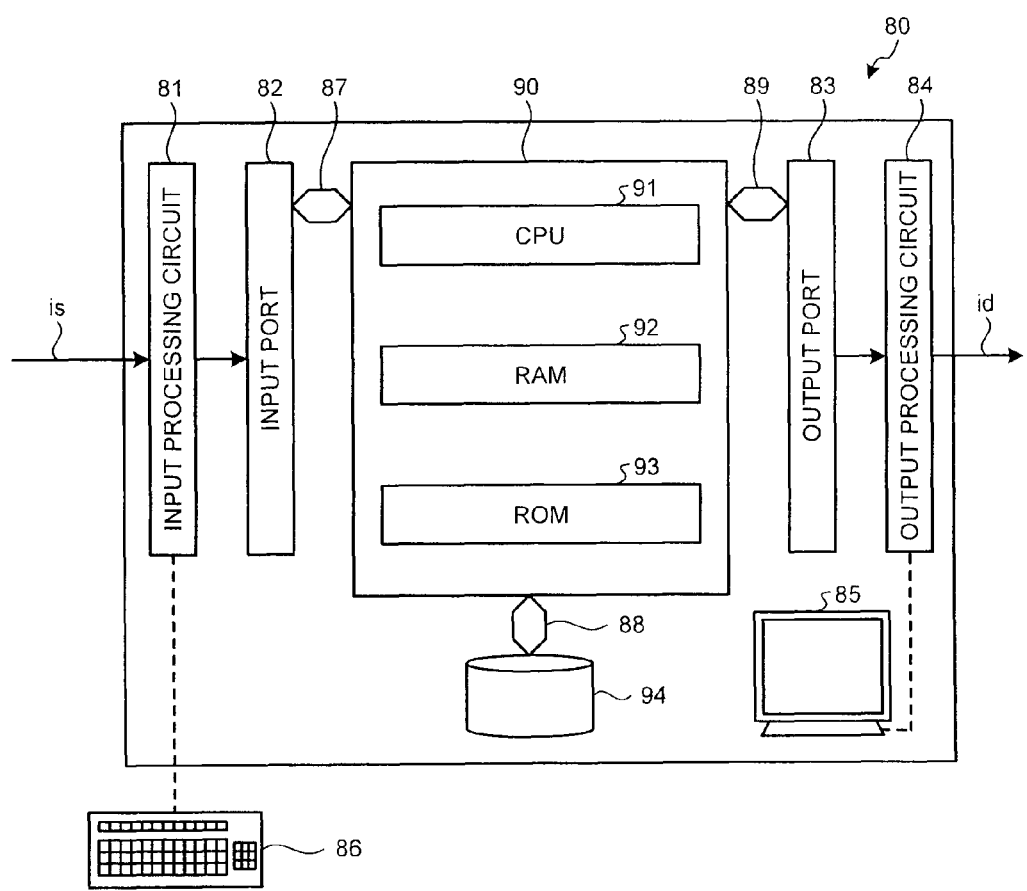
FIG. 3 is a schematic diagram illustrating a measurement control device.
Figure 4:
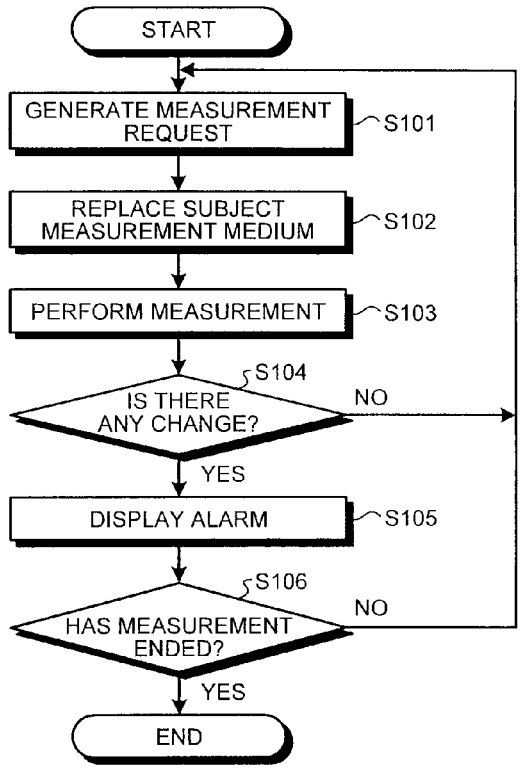
FIG. 4 is a flowchart illustrating a procedure of monitoring a nuclear reactor fuel state.

FIG. 2 is a schematic diagram illustrating an example of the nuclear reactor fuel integrity monitor according to the first embodiment. FIG. 3 is a schematic diagram illustrating a measurement control device. FIG. 4 is a flowchart illustrating a procedure of monitoring the nuclear reactor fuel state.

As illustrated in FIG. 2, a nuclear reactor fuel integrity monitor 100 includes a radioactive noble gas detecting device 30, a measurement control device 80, opening and closing valves 41 and 42, and valve control units 43 and 44. The radioactive noble gas detecting device 30 is disposed between the gas phase sampling point 21 and an exhaust process connection point 45 and is connected to the gas phase sampling point 21 and the exhaust process connection point 45 through a gas passageway 24A, a gas passageway 24C, and a gas passageway 46. The gas G which is supplied from the gas phase sampling point 21 is branched from the gas passageway 24A into the gas passageway 24C and a gas passageway 24B by a branch point 23. The gas G which is branched to the gas passageway 24B is supplied to an analysis device 22.

The radioactive noble gas detecting device 30 includes a γ-ray detector 31, a sample loop 32 as a sample container, and a lead shield 33. Radioactive argon (Ar-41), radioactive krypton (Kr-85, Kr-85 m, Kr-87), and radioxenon (Xe-133, Xe-135) may be dissolved as a radioactive noble gas in the nuclear reactor coolant C1. In order to monitor the nuclear reactor fuel state, it is important to monitor the concentration of radioxenon (Xe-133, Xe-135). The radioactive noble gas detecting device 30 may detect radioxenon (Xe-133, Xe-135).

As the γ-ray detector 31, for example, a NaI scintillation detector or a Ge-semiconductor detector is used. The NaI scintillation detector and the Ge-semiconductor detector may obtain a γ-ray spectrum. Since the detection efficiency and the maintenance workability of the NaI scintillation detector are better than those of the Ge-semiconductor detector, it is desirable to use the former as the γ-ray detector 31. The resolution of the NaI scintillation detector is about 80 keV at FWHM (Full width at half maximum). Therefore, NaI scintillation detector may discriminate and measure the γ-ray of 81.0 keV emitted from Xe-133 and the γ-ray of 249.7 keV emitted from Xe-135. Since the count rates of the respective energy regions of Xe-133 and Xe-135 are discriminated and calculated, both radionuclides of Xe-133 and Xe-135 may be quantitatively measured. Furthermore, in the NaI scintillation detector, it is desirable that the periphery of the NaI scintillation detector be maintained at a constant temperature from the viewpoint of preventing noise.

When the resolution of the γ-ray detector 31 is increased and a radioactive noble gas other than both radionuclides of Xe-133 and Xe-135 is detected, the Ge-semiconductor detector is desirable as the γ-ray detector 31 compared to the NaI scintillation detector. However, since the Ge-semiconductor detector has about 10% of the γ-ray sensitivity of the NaI scintillation detector, it is desirable to increase the volume of the gas G as the subject measurement medium when using the Ge-semiconductor detector as the γ-ray detector 31.

The sample loop 32 is a sample container which retains the gas G as a subject measurement medium therein. The sample loop 32 is formed in a tubular shape, and may retain the gas G as the subject measurement medium inside the hollow portion. Since the sample loop 32 is formed in a hollow tubular shape, the gas G may be easily purged. For this reason, the replacement may be easily performed by supplying a new subject measurement medium into the sample loop 32.

The sample loop 32 is disposed so as to surround the circumference of the γ-ray detector 31. For example, as illustrated in FIG. 2, the sample loop 32 is wound on the circumference of the γ-ray detector 31 in a spiral shape, and surrounds the circumference of the γ-ray detector 31. The gas G as the subject measurement medium surrounds the circumference of the γ-ray detector 31 which is held by the sample loop 32. The internal volume of the sample loop 32 and the number of times in which the sample loop is wound on the circumference of the γ-ray detector 31 in a spiral shape are set so as to match the concentration of the radionuclide included in the gas G as the subject measurement medium. For example, when the γ-ray detector 31 is the NaI scintillation detector, the internal volume of the sample loop 32 is about 20 ml.

Further, when the sample loop 32 is degraded or the internal volume is changed, the sample loop 32 needs to be changed. For this reason, it is desirable that the sample loop 32 be separated from the circumference of the γ-ray detector 31 for the replacement.

The lead shield 33 is a lead plate. The lead shield 33 is thickened as much as possible and is disposed so as to surround at least the γ-ray detector 31 and the sample loop 32. The lead shield 33 prevents the γ-ray from reaching the γ-ray detector 31 from the outside of the radioactive noble gas detecting device 30.

The gas passageway 24A, the gas passageway 24C, and the gas passageway 46 are formed in a tubular shape, so that the gas G may pass therethrough. The opening and closing valve 41 is connected to the gas passageway 24C, and may adjust the amount of the gas G which is supplied from the gas passageway 24C to the radioactive noble gas detecting device 30. The opening and closing valve 42 is connected to the gas passageway 46, and may adjust the amount of the gas G which is discharged from the radioactive noble gas detecting device 30 to the gas passageway 46. The valve control units 43 and 44 control the opening and closing degrees of the opening and closing valves 41 and 42.

As illustrated in FIG. 2, the gas G which is supplied from the gas phase sampling point 21 is supplied to the gas passageway 24A. The gas passageway 24A supplies the gas G to the branch point 23. The branch point 23 distributes the gas G to the gas passageway 24B and the gas passageway 24C.

The radioactive noble gas detecting device 30 may receive the gas G supplied from the gas passageway 24C through the opening and closing valve 41. Further, when the opening and closing valves 41 and 42 are opened, the gas G supplied from the gas passageway 24C is extruded, so that the gas inside the radioactive noble gas detecting device 30 is discharged to the gas passageway 46 through the opening and closing valve 42. The exhaust process connection point 45 is connected to a facility that appropriately treats the gas G supplied from the gas passageway 46.

The γ-ray detector 31 of the radioactive noble gas detecting device 30 is connected to the measurement control device 80. Then, the γ-ray detector 31 is electrically connected to the measurement control device 80 so as to transmit and receive the measurement data is or the instruction signal.

The measurement control device 80 is electrically connected to the valve control unit 43 and the valve control unit 44 so that the instruction signal id may be transmitted to the valve control unit 43 which controls the opening and closing degree of the opening and closing valve 41 and the valve control unit 44 which controls the opening and closing degree of the opening and closing valve 42.

Further, the gas G which is supplied from the gas passageway 24B moves to the analysis device 22. For example, the analysis device 22 detects the concentration and the like of hydrogen or oxygen included in the gas G. The nuclear reactor fuel integrity monitor 100 of the first embodiment commonly shares the gas phase sampling point 21 and the gas passageway 24A with the analysis device 22.

As illustrated in FIG. 3, the measurement control device 80 includes an input processing circuit 81, an input port 82, a process unit 90, a storage unit 94, an output port 83, an output processing circuit 84, and a display device 85. The measurement control device further includes an input device 86 such as a keyboard if necessary. The process unit 90 includes, for example, a CPU (Central Processing Unit) 91, a RAM 92, and a ROM 93.

The process unit 90, the storage unit 94, the input port 82, and the output port 83 are connected to one another through a bus 87, a bus 88, and a bus 89. By the bus 87, the bus 88, and the bus 89, the CPU 91 of the process unit 90 may exchange control data with or transmit an instruction to any one of the storage unit 94, the input port 82, and the output port 83.

The input processing circuit 81 is connected to the input port 82. The input processing circuit 81 is connected with the measurement data is from the γ-ray detector 31. Then, the measurement data is which is output from the γ-ray detector 31 of the radioactive noble gas detecting device 30 is converted into a signal which may be used by the process unit 90 through a noise filter or an A/D converter provided in the input processing circuit 81, and is transmitted to the process unit 90 through the input port 82. Accordingly, the process unit 90 may acquire information necessary for calculating the concentration of the radionuclide.

The output port 83 is connected with the output processing circuit 84. The output processing circuit 84 is connected with the display device 85 or the external output terminal. The output processing circuit 84 includes a display device control circuit, a valve control signal circuit for the opening and closing valve, a signal amplifying circuit, and the like. The output processing circuit 84 outputs the concentration of the radionuclide calculated by the process unit 90 as a display signal for displaying the concentration on the display device 85 or outputs the concentration as the instruction signal id transmitted to the g-ray detector 31 and the valve control units 43 and 44. As the display device 85, for example, a liquid crystal display panel, a CRT (Cathode Ray Tube), or the like may be used.

The storage unit 94 stores a computer program including a procedure of monitoring the nuclear reactor fuel state, a database of radionuclide concentration measurement data, and the like. Here, the storage unit 94 may include a volatile memory such as a RAM (Random Access Memory), a non-volatile memory such as a flash memory, and a hard disk or the combination of these.

The computer program may execute a procedure of monitoring the nuclear reactor fuel state by the combination with the computer program which is previously stored in the process unit 90. Further, the measurement control device 80 may execute the procedure of monitoring the nuclear reactor fuel state by using exclusive hardware instead of the computer program.

Further, the procedure of monitoring the nuclear reactor fuel state may be realized by executing the prepared program through a computer system such as a personal computer, a workstation, or a plant control computer. Further, the program is stored in a storage device such as a hard disk or a storage medium such as a flexible disk (FD), a ROM, a CD-ROM, a MO, a DVD, and a flash memory which may be read by the computer, and may be executed by reading out the program from the storage medium through the computer. Furthermore, the "computer system" mentioned herein includes hardware such as an OS or a peripheral device.

Further, the "storage medium which may be read out by the computer" includes the case of dynamically storing the program for a short time as in a communication line used when transmitting the program through a network such as an internet or a communication network such as a phone line or the case of storing the program for a predetermined time as in a volatile memory inside a computer system which becomes a server or a client in that case. Further, the program may realize a part of the above-described function and further realize the above-described function by the combination with the program previously stored in the computer system.

Next, the procedure of monitoring the nuclear reactor fuel state will be described by referring to FIGS. 2, 3, and 4. First, the CPU 91 of the process unit 90 included in the measurement control device 80 illustrated in FIGS. 2 and 3 receives the measurement request input from the input device 86 through the input processing circuit 81 and the input port 82, and temporarily stores the measurement request in the RAM 92 or the storage unit 94 (step S101). Alternatively, the CPU 91 stores the measurement request which is repeated every predetermined time in the RAM 92 or the storage unit 94 in advance. The CPU 91 generates a valve control instruction signal to be transmitted to the valve control units 43 and 44 which control the opening and closing degrees of the opening and closing valves 41 and 42 by using the measurement request as a trigger.

Next, the CPU 91 outputs the valve opening instruction signal from the output signal processing circuit 84 to the valve control units 43 and 44 through the output port 83. The valve control units 43 and 44 which receive the valve opening instruction signal open the opening and closing valves 41 and 42 so as to supply the gas G as the subject measurement medium from the gas passageway 24C into the sample loop 32 and the gas G remaining inside the sample loop 32 is extruded by the supplied gas G so as to be entirely discharged. Furthermore, the exhaust may be performed by using a three-way valve in the opening and closing valve 41. Next, the valve control unit 44 closes the opening and closing valve 42 based on the valve closing instruction signal of the CPU 91. Next, the valve control unit 43 closes the opening and closing valve 41 based on the valve closing instruction signal of the CPU 91 so as to seal the gas G inside the sample loop 32. Then, since the gas G which remains inside the sample loop 32 is extruded by the gas G supplied from the gas passageway 24C so as to be entirely discharged, the gas which remains inside the sample loop 32 changes to the gas G of the new subject measurement medium (step S102).

Next, the CPU 91 outputs the instruction signal id from the output signal processing circuit 84 to the radioactive noble gas detecting device 30 through the output port 83. The γ-ray detector 31 of the radioactive noble gas detecting device 30 which receives the instruction signal id starts the measurement. When the γ-ray detector 31 is, for example, the NaI scintillation detector, the measurement time of the γ-ray detector 31 is from 600 seconds to 1000 seconds. Then, the measurement data is of the γ-ray detector 31 is input to the measurement control device 80 (step S103).

The measurement control device 80 discriminates and calculates the count rates of the respective energy regions of Xe-133 and Xe-135 from the input measurement data is of the γ-ray detector 31. The CPU 91 calculates the concentrations of the respective radionuclides of Xe-133 and Xe-135 from the data of the internal volume of the sample loop 32 stored in advance in the RAM 92 or the storage unit 94 and the count rates of the respective energy regions of Xe-133 and Xe-135. Specifically, the values which are obtained by dividing the number of signals per each unit time in the respective energy regions of Xe-133 and Xe-135 by the internal volume of the sample loop 32 become the concentrations of the respective radionuclides.

The CPU 91 stores the concentrations of the respective radionuclides of Xe-133 and Xe-135 in the RAM 92 or the storage unit 94. The CPU 91 checks if there is measurement data of the precedent concentrations of the respective radionuclides of Xe-133 and Xe-135 stored in the RAM 92 or the storage unit 94. When there are the precedent concentrations of the respective radionuclides of Xe-133 and Xe-135, the CPU 91 compares the precedent concentrations of the respective radionuclides of Xe-133 and Xe-135 with the current concentrations of the respective radionuclides of Xe-133 and Xe-135. When the measurement data of the precedent concentrations of the respective radionuclides of Xe-133 and Xe-135 is not stored in the RAM 92 or the storage unit 94, the procedure of monitoring the nuclear reactor fuel state returns to step S101. When the concentration change rates of the respective radionuclides of Xe-133 and Xe-135 are within, for example, 50%/week, the procedure of monitoring the nuclear reactor fuel state returns to step S101 as a result in which the concentrations of the respective radionuclides of Xe-133 and Xe-135 are not changed (No in step S104). When the concentration change rates of the respective radionuclides of Xe-133 and Xe-135 exceed, for example, 50%/week, the procedure of monitoring the nuclear reactor fuel state proceeds to step S105 as a result in which the concentrations of the respective radionuclides of Xe-133 and Xe-135 are changed (Yes in step S104). Then, the CPU 91 outputs an alarm display on the display device 85 (step S105). Subsequently, when the repeated measurement is needed, the CPU 91 disaffirms the measurement end determination (No in step S106), and the procedure returns to the measurement request step S101 so as to continue the measurement. When the repeated measurement is not needed, the CPU 91 affirms the measurement end determination so as to end the measurement (Yes in step S106).

The nuclear reactor fuel integrity monitor 100 of the first embodiment includes the γ-ray detector 31 which detects the γ-ray of the specific radionuclide of the subject measurement medium of the nuclear reactor, the sample loop 32 which is the sample container formed in a shape of causing the subject measurement medium to surround the g-ray detector 31, and the measurement control device 80 which controls the opening and closing valves 41 and 42 so that a predetermined amount of the gas G as the subject measurement medium is introduced into the sample loop 32 and calculates the concentration of the specific radionuclide from the γ-ray data per each unit time detected by the γ-ray detector 31 and the volume of the gas G as the subject measurement medium introduced into the sample loop 32. Accordingly, the dissolved gas included in the nuclear reactor coolant C1 of the nuclear reactor is periodically sampled as the gas G from the gas phase sampling point 21 without the operator's labor, so that the concentration of the specific radionuclide included in the gas G may be measured. Since the sample loop 32 is formed in a shape in which the gas G as the subject measurement medium surrounds the γ-ray detector 31, it is possible to increase the volume of the subject measurement medium which may be detected by the γ-ray detector 31. Since the amount of the γ-ray which may be detected by the γ-ray detector 31 increases, there is no need to perform an operation which concentrates the subject measurement medium so as to improve the detection efficiency of the γ-ray detector 31. Further, since the opening and closing valves 41 and 42 are controlled so that a predetermined amount of the subject measurement medium is introduced into the sample container, it is possible to periodically measure the γ-ray of the subject measurement medium which is introduced into the sample loop 32 without needing the operator's labor. Further, the nuclear reactor fuel integrity monitor 100 of the first embodiment may calculate the concentration for each specific radionuclide.

Further, the sample loop 32 as the sample container is formed in a hollow shape, and is wound on the γ-ray detector 31 in a spiral shape, so that the gas G inside the sample loop 32 surrounds the γ-ray detector. When the sample loop 32 is formed in a hollow shape and the new subject measurement medium flows thereinto, the subject measurement medium may be replaced without leaving the old gas of the sample loop 32. For this reason, when the new gas G as the subject measurement medium enters the sample loop 32, the old gas is extruded so as to be replaced by the new gas.

Since the subject measurement medium is the gas G and the specific radionuclide is radioxenon, it is possible to generate an alarm at an early timing when radioxenon is discharged from the nuclear reactor fuel 2C. The nuclear reactor fuel integrity monitor 100 of the first embodiment may continuously measure the concentration of the specific radionuclide included in the gas G every predetermined time when periodically performing the measurement request on the radioactive noble gas detecting device 30.

(Second Embodiment)

Figure 5:
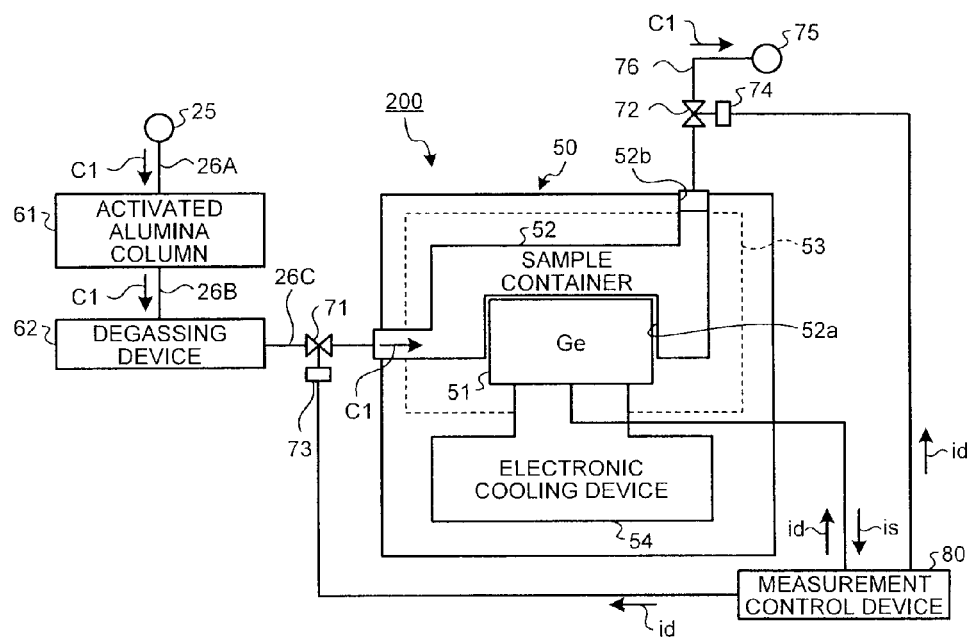
FIG. 5 is a schematic diagram illustrating an example of a nuclear reactor fuel integrity monitor according to a second embodiment.

FIG. 5 is a schematic diagram illustrating an example of a nuclear reactor fuel integrity monitor according to a second embodiment. Furthermore, the same reference signs will be given to the same constituents of the above-described embodiment, and the description thereof will not be repeated.

As illustrated in FIG. 5, a nuclear reactor fuel integrity monitor 200 includes a radioactive iodine detecting device 50, the measurement control device 80, opening and closing valves 71 and 72, valve control units 73 and 74, an activated alumina column 61 as a pre-treatment facility, and a degassing device 62. The radioactive iodine detecting device 50 is disposed between the nuclear reactor coolant sampling point 25 and a drainage treatment connection point 75, and is connected to the nuclear reactor coolant sampling point 25 and the drainage treatment connection point 75 through a nuclear reactor coolant passageway 26A, the activated alumina column 61, a nuclear reactor coolant passageway 26B, the degassing device 62, a nuclear reactor coolant passageway 26C, and a nuclear reactor coolant passageway 76.

The radioactive iodine detecting device 50 includes at least a γ-ray detector 51, a sample container 52, and a lead shield 53. Further, the radioactive iodine detecting device 50 includes an electronic cooling device 54. Furthermore, the electronic cooling device 54 may be provided if necessary, and is not essentially needed. The nuclear reactor coolant C1 may include radioactive iodine (I-131, I-132, I-133, I-134, I-135), radioactive fluorine (F-18), and radioactive argon (Ar-41) dissolved therein as the radionuclide. In order to monitor the nuclear reactor fuel state, it is important to monitor the concentration of radioactive iodine (I-131, I-133, I-135) in radioactive iodine (I-131, I-132, I-133, I-134, I-135). The radioactive iodine detecting device 50 may detect radioactive iodine (I-131, I-132, I-133, I-134, I-135).

As the γ-ray detector 51, for example, the NaI scintillation detector or the Ge-semiconductor detector is used. Since the resolution is more important than the detection efficiency or the maintenance workability, it is desirable to use the Ge-semiconductor detector as the γ-ray detector 51 compared to the NaI scintillation detector.

As illustrated in FIG. 5, the sample container 52 includes a sample container recess portion 52a into which the γ-ray detector 51 is inserted. The nuclear reactor coolant C1 as the subject measurement medium which is retained by the sample container 52 surrounds the circumference of the γ-ray detector 51. Since the nuclear reactor coolant C1 as the subject measurement medium surrounds the circumference of the γ-ray detector 51, the amount of the γ-ray from the nuclear reactor coolant C1 as the subject measurement medium to the γ-ray detector 51 increases. For example, in an existing measurement method of concentrating and collecting radioactive iodine by an anion exchange filter so that the radioactive iodine adheres to the γ-ray detector 51, the nuclear reactor coolant C1 is used by 10 ml to 50 ml. The sample container 52 of the second embodiment retains the nuclear reactor coolant C1 at the volume of 100 ml to 200 ml. Then, since the subject measurement medium surrounds the circumference of the γ-ray detector 51, the γ-ray detector 51 may detect the γ-ray which is caused by the radioactive iodine from the nuclear reactor coolant C1 in the sample container 52 substantially at the same sensitivity as that of the existing measurement method of concentrating and collecting the radioactive iodine by the anion exchange filter so that the radioactive iodine adheres to the γ-ray detector 51.

The sample container 52 includes a volume adjusting portion 52b which presses the liquid level of the nuclear reactor coolant C1 as the subject measurement medium upward. Since the volume adjusting portion 52b is provided, bubbles of an extra gas are eliminated from the circumference of the γ-ray detector 51. As a result, the volume of the nuclear reactor coolant C1 which exists in the circumference of the γ-ray detector 51 becomes constant.

Further, the nuclear reactor fuel integrity monitor 200 prepares a plurality of sample containers 52 of which the volumes are changed in accordance with the radioactive concentration of the nuclear reactor coolant C1 as the subject measurement medium, so that the sample containers 52 having appropriate volumes may be attached to the circumference of the γ-ray detector 51. Since the sample containers 52 may be replaced, the inside of the sample containers 52 may be cleaned during the replacement.

The lead shield 53 is a lead plate. The lead shield 53 is disposed so as to surround at least the γ-ray detector 51 and the sample container 52. It is desirable that the lead shield 53 be thickened as much as possible so as to prevent the γ-ray from reaching the γ-ray detector 51 from the outside of the radioactive iodine detecting device 50.

When the γ-ray detector 51 is the Ge-semiconductor detector, the electronic cooling device 54 is connected to the Ge-semiconductor detector so as to reduce the current leaking to the Ge-semiconductor detector or the noise. The electronic cooling device 54 cools the Ge-semiconductor detector to, for example, the temperature substantially the same as that of the liquid nitrogen. The Ge-semiconductor detector may be cooled by using the liquid nitrogen instead of the electronic cooling device 54.

As illustrated in FIG. 5, in the radioactive iodine detecting device 50, the nuclear reactor coolant C1 which is sampled from the nuclear reactor coolant sampling point 25 passes through the nuclear reactor coolant passageway 26A, the activated alumina column 61 as the pre-treatment facility, the nuclear reactor coolant passageway 26B, the degassing device 62 as the pre-treatment facility, the nuclear reactor coolant passageway 26C, and the opening and closing valve 71. The radioactive iodine detecting device 50 may discharge the nuclear reactor coolant C1 to the drainage treatment connection point 75 through the opening and closing valve 72 and the nuclear reactor coolant passageway 76. The drainage treatment connection point 75 is connected to the facility that may appropriately treats the nuclear reactor coolant C1 supplied from the nuclear reactor coolant passageway 76. Further, the g-ray detector 51 of the radioactive iodine detecting device 50 is connected to the measurement control device 80. Then, the measurement control device 80 receives the measurement data is of the γ-ray detector 51. Further, the instruction signal id of the measurement control device 80 may be input to the γ-ray detector 51.

The measurement control device 80 is connected to the valve control unit 73 and the valve control unit 74 so that the instruction signal id may be transmitted to the valve control unit 73 which controls the opening and closing degree of the opening and closing valve 71 and the valve control unit 74 which controls the opening and closing degree of the opening and closing valve 72. The measurement control device 80 is the same as that of the first embodiment.

The activated alumina column 61 as the pre-treatment facility is a column which is filled with activated alumina, and the nuclear reactor coolant C1 which is injected from the nuclear reactor coolant sampling point 25 may pass therethrough.

Radioactive fluorine (F-18) included in the nuclear reactor coolant C1 becomes the hindering nuclide in which radioactive iodine (I-131, I-132, I-133, I-134, I-135) is analyzed by the γ-ray detector 51. In general, the nuclear reactor coolant C1 passes through the anion exchange filter, and radioactive fluorine and radioactive iodine are concentrated and collected in the anion exchange filter. Then, since the radioactive fluorine is a short-half-life radionuclide, the collapsing of the radioactive fluorine is awaited and the radioactive iodine is analyzed by the γ-ray detector. The detection sensitivity of the γ-ray measurement is greatly affected by the positional relation between the γ-ray detector and the sample of the measurement subject. Since the radioactive iodine collected on the anion exchange filter may be measured while adhering to the γ-ray detector, the detection efficiency is high. However, the automation without the operator's labor is difficult from the viewpoint of the cost and the mechanism. In a general method, some time is needed for the collapsing of the radioactive fluorine and the concentration and the collection are manually performed. For this reason, it is difficult to periodically sample the nuclear reactor coolant C1 of the nuclear reactor from the nuclear reactor coolant sampling point 25 without the operator's labor and to measure the concentration of the specific radionuclide included in the sampled nuclear reactor coolant C1.

In the activated alumina column 61 of the second embodiment, when the nuclear reactor coolant C1 passes therethrough, the radioactive fluorine is absorbed onto the activated alumina and the nuclear reactor coolant C1 from which the radioactive fluorine is eliminated is discharged to the degassing device 62. For this reason, in the nuclear reactor fuel integrity monitor 200 of the second embodiment, even when the nuclear reactor coolant C1 of the nuclear reactor is periodically sampled from the nuclear reactor coolant sampling point 25 without the operator's labor, the radioactive fluorine as the hindering nuclide is not supplied to the radioactive iodine detecting device 50. Furthermore, the activated alumina column 61 may be periodically replaced.

Further, radioactive argon (Ar-41) which is included in the nuclear reactor coolant C1 becomes the hindering nuclide in which radioactive iodine (I-131, I-132, I-133, I-134, I-135) is analyzed by the γ-ray detector 51 as in the radioactive fluorine (F-18). The radioactive argon (Ar-41) is not eliminated from the activated alumina column 61. Therefore, the nuclear reactor coolant C1 from the activated alumina column 61 passes through the degassing device 62. The degassing device 62 eliminates the radioactive argon (Ar-41), and discharges the nuclear reactor coolant C1 from which the radioactive argon (Ar-41) is eliminated to the radioactive iodine detecting device 50. Further, the degassing device 62 eliminates the gas which is dissolved in the nuclear reactor coolant C1 other than the radioactive argon (Ar-41).

In the second embodiment, the nuclear reactor coolant C1 is pre-treated by the activated alumina column 61 and the degassing device 62 in this order, so that the radioactive fluorine (F-18) and the radioactive argon (Ar-41) are eliminated. Furthermore, the sequence of arranging the activated alumina column 61 and the degassing device 62 may be reversed. Further, the nuclear reactor coolant C1 includes radioactive sodium (Na-24), and in the case of the hindering nuclide in which the radioactive iodine is analyzed by the g-ray detector 51, a cation exchange column may be further provided as the pre-treatment.

Next, the procedure of monitoring the nuclear reactor fuel state will be described by referring to FIGS. 3, 4, and 5. First, the CPU 91 of the process unit 90 which is included in the measurement control device 80 illustrated in FIGS. 3 and 5 receives the measurement request input from the input device 86 through the input processing circuit 81 and the input port 82, and temporarily stores the measurement request in the RAM 92 or the storage unit 94 (step S101). Alternatively, the CPU 91 stores the measurement request which is repeated every predetermined time in the RAM 92 or the storage unit 94 in advance. The CPU 91 converts the measurement request into the instruction signal id to be transmitted to the valve control units 73 and 74 which control the opening and closing degrees of the opening and closing valves 71 and 72 (step S101).

Next, the CPU 91 outputs the valve opening instruction signal from the output signal processing circuit 84 to the valve control units 73 and 74 through the output port 83. The valve control units 73 and 74 which receive the valve opening instruction signal open the opening and closing valves 71 and 72 so as to supply the nuclear reactor coolant C1 as the subject measurement medium from the nuclear reactor coolant passageway 26C into the sample container 52 and to discharge the nuclear reactor coolant C1 remaining inside the sample container 52 by the supplied nuclear reactor coolant C1. Next, the valve control unit 74 closes the opening and closing valve 72 based on the valve closing instruction signal of the CPU 91. Next, the valve control unit 73 closes the opening and closing valve 71 based on the valve closing instruction signal of the CPU 91, and seals the nuclear reactor coolant C1 inside the sample container 52. Then, the nuclear reactor coolant C1 remaining inside the sample container 52 is replaced by the nuclear reactor coolant C1 of the new subject measurement medium by the nuclear reactor coolant C1 which is supplied from the nuclear reactor coolant passageway 26C (step S102). Since there is a possibility that the nuclear reactor coolant C1 may include a short-half-life radionuclide, it is desirable that the decay time be, for example, about 80 minutes.

Next, the CPU 91 outputs the instruction signal id from the output signal processing circuit 84 to the radioactive iodine detecting device 50 through the output port 83. The γ-ray detector 51 of the radioactive iodine detecting device 50 which receives the instruction signal id starts the measurement. When the γ-ray detector 51 is, for example, the Ge-semiconductor detector, the measurement time of the γ-ray detector 51 is 15 minutes. Then, the measurement data is of the γ-ray detector 51 is input to the measurement control device 80 (step S103).

The measurement control device 80 discriminates and calculates the count rates of the respective energy regions of I-131, I-132, I-133, I-134, and I-135 from the input measurement data is of the γ-ray detector 51. The CPU 91 calculates the concentrations of the respective radionuclides of I-131, I-132, I-133, I-134, and I-135 from the data of the internal volume of the sample container 52 stored in the RAM 92 or the storage unit 94 in advance and the count rates of the respective energy regions of I-131, I-132, I-133, I-134, and I-135. Specifically, the value which is obtained by dividing the number of signals per unit time in each of the energy regions of I-131, I-132, I-133, I-134, and I-135 by the internal volume of the sample container 52 becomes the concentration of each of radionuclides.

The CPU 91 stores the concentrations of the respective radionuclides of I-131, I-132, I-133, I-134, and I-135 in the RAM 92 or the storage unit 94. The CPU 91 checks if there is measurement data of the precedent concentrations of the respective radionuclides of I-131, I-133, and I-135 stored in the RAM 92 or the storage unit 94. When there is the measurement data of the precedent concentrations of the respective radionuclides of I-131, I-133, and I-135, the CPU 91 compares the precedent concentrations of the respective radionuclides of I-131, I-133, and I-135 with the current concentrations of the respective radionuclides of I-131, I-133, and I-135. When the measurement data of the precedent concentrations of the respective radionuclides of I-131, I-133, and I-135 is not stored in the RAM 92 or the storage unit 94, the procedure of monitoring the nuclear reactor fuel state returns to step S101. When the concentration change rate of each radionuclide of radioactive iodine (I-131, I-133, I-135) is within, for example, 50%/week, the procedure of monitoring the nuclear reactor fuel state returns to step S101 as a result in which the concentration of each radionuclide of radioactive iodine (I-131, I-133, I-135) is not changed (No in step S104). When the concentration change rate of each radionuclide of radioactive iodine (I-131, I-133, I-135) exceeds, for example, 50%/week, the procedure of monitoring the nuclear reactor fuel state proceeds to the next step as a result in which the concentration of each radionuclide of radioactive iodine (I-131, I-133, I-135) is changed (Yes in step S104). Then, the CPU 91 outputs an alarm display on the display device 85 (step S105). Subsequently, when the repeated measurement is needed, the CPU 91 disaffirms the measurement end determination (No in step S106), and the procedure returns to the measurement request step S101 so as to continue the measurement. When the repeated measurement is not needed, the CPU 91 affirms the measurement end determination so as to end the measurement (Yes in step S106).

The nuclear reactor fuel integrity monitor 200 of the second embodiment includes the γ-ray detector 51 which detects the γ-ray of the specific radionuclide of the subject measurement medium of the nuclear reactor, the sample container 52 which is formed in a shape of causing the subject measurement medium to surround the γ-ray detector 51, and the measurement control device 80 which controls the opening and closing valves 71 and 72 so that a predetermined amount of the nuclear reactor coolant C1 as the subject measurement medium is introduced into the sample container 52 and calculates the concentration of the specific radionuclide from the γ-ray data per unit time detected by the γ-ray detector 51 and the volume of the nuclear reactor coolant C1 as the subject measurement medium introduced into the sample container 52. Accordingly, the nuclear reactor coolant C1 of the nuclear reactor is periodically sampled from the nuclear reactor coolant sampling point 25 without the operator's labor, so that the concentration of the specific radionuclide included in the nuclear reactor coolant C1 may be measured. Since the sample container 52 is formed in a shape in which the γ-ray detector 51 is surrounded by the nuclear reactor coolant C1 as the subject measurement medium, it is possible to increase the volume of the subject measurement medium which may be detected by the γ-ray detector 51. Since the amount of the γ-ray which may be detected by the γ-ray detector 31 increases, there is no need to perform the operation of concentrating the subject measurement medium so as to improve the detection efficiency of the γ-ray detector 31. Further, since the opening and closing valves 71 and 72 are controlled so that a predetermined amount of the subject measurement medium is introduced into the sample container 52, it is possible to periodically measure the γ-ray of the subject measurement medium introduced into the sample container 52 without the operator's labor. Further, the nuclear reactor fuel integrity monitor 200 of the second embodiment may calculate the concentration for each specific radionuclide.

Since the sample container 52 includes the sample container recess portion 52a and the γ-ray detector 51 is inserted into the sample container recess portion 52a, the nuclear reactor coolant C1 as the subject measurement medium surrounds the circumference of the γ-ray detector 51, and the amount of the γ-ray which is received by the γ-ray detector 51 from the nuclear reactor coolant C1 as the subject measurement medium increases.

Further, when the radioactive iodine is discharged from the nuclear reactor fuel 2C, it is possible to generate an alarm at an early timing. In the nuclear reactor fuel integrity monitor 200 of the second embodiment, when the measurement request of the radioactive iodine detecting device 50 is periodically performed, the concentration of the specific radionuclide included in the nuclear reactor coolant C1 is continuously measured every predetermined time.

Further, since the nuclear reactor coolant C1 as the subject measurement medium passes through the activated alumina column 61 so as to be introduced into the sample container 52, even when the nuclear reactor coolant C1 of the nuclear reactor is periodically sampled from the nuclear reactor coolant sampling point 25 without the operator's labor, the radioactive fluorine as the hindering nuclide is not supplied to the radioactive iodine detecting device 50. Then, the radioactive iodine is measured by the γ-ray detector 51 without the interference of the radioactive fluorine.

Both the nuclear reactor fuel integrity monitor 100 of the first embodiment and the nuclear reactor fuel integrity monitor 200 of the second embodiment may be connected to the nuclear plant 1. In this case, the nuclear reactor fuel integrity monitor 100 includes a first γ-ray detector which detects a γ-ray of a first specific radionuclide and a first sample container, and the nuclear reactor fuel integrity monitor 200 includes a second γ-ray detector which detects a γ-ray of a second specific radionuclide and a second sample container. Further, the measurement control device 80 performs a control so that a predetermined amount of the gas is introduced into the first sample container and a predetermined amount of the coolant is introduced into the second sample container. Also, the measurement control device calculates the concentrations of the first and second specific radionuclides from the γ-ray data per unit time detected by the first and second γ-ray detectors and the volume of the subject measurement medium introduced into the first and second sample containers. Since both the nuclear reactor fuel integrity monitors 100 and 200 are provided, the nuclear reactor fuel state may be monitored based on the measurement results of both the gas G and the nuclear reactor coolant C1.

REFERENCE SIGNS LIST

1 NUCLEAR PLANT
1W CONTAINMENT
2 NUCLEAR REACTOR
2C NUCLEAR REACTOR FUEL
3 STEAM GENERATOR
3T HEAT TRANSFER PIPE
4 PRESSURIZER
5 NUCLEAR REACTOR COOLANT PUMP
13A NUCLEAR REACTOR COOLANT EXTRACTING PASSAGEWAY
13B, 13C, 13D NUCLEAR REACTOR COOLANT PASSAGEWAY
13E, 13F NUCLEAR REACTOR COOLANT RETURNING PASSAGEWAY
14 VOLUME CONTROL TANK
14a GAS PHASE PORTION
15 CHARGING PUMP
16 DESALINATION TOWER
21 GAS PHASE SAMPLING POINT
22 ANALYSIS DEVICE
23 BRANCH POINT
24A, 24B, 24C GAS PASSAGEWAY
25 NUCLEAR REACTOR COOLANT SAMPLING POINT
26A, 26B, 26C NUCLEAR REACTOR COOLANT PASSAGEWAY
30 RADIOACTIVE NOBLE GAS DETECTING DEVICE
31 γ-RAY DETECTOR
32 SAMPLE LOOP
33 LEAD SHIELD
41, 42 OPENING AND CLOSING VALVE
43, 44 VALVE CONTROL UNIT
45 EXHAUST PROCESS CONNECTION POINT
46 GAS PASSAGEWAY
50 RADIOACTIVE IODINE DETECTING DEVICE
51 γ-RAY DETECTOR
52 SAMPLE CONTAINER
52a SAMPLE CONTAINER RECESS PORTION
52b VOLUME ADJUSTING PORTION
53 LEAD SHIELD
54 ELECTRONIC COOLING DEVICE
61 ACTIVATED ALUMINA COLUMN
62 DEGASSING DEVICE
71, 72 OPENING AND CLOSING VALVE
73, 74 VALVE CONTROL UNIT
75 DRAINAGE TREATMENT CONNECTION POINT
76 NUCLEAR REACTOR COOLANT PASSAGEWAY
80 MEASUREMENT CONTROL DEVICE
90 PROCESS UNIT
91 CPU
92 RAM
93 ROM
94 STORAGE UNIT
100, 200 NUCLEAR REACTOR FUEL INTEGRITY MONITOR

The invention claimed is:

1. A nuclear reactor fuel integrity monitor comprising:
   a γ-ray detector which detects γ-ray of a specific radionuclide of a subject measurement medium of a nuclear reactor;
   a sample container which retains the subject measurement medium therein and surrounds the circumference of the γ-ray detector;
   a valve that controls an amount of the subject measurement medium to allow to flow into the sample container;
   a measurement control device which controls the valve so that a predetermined amount of the subject measurement medium is introduced into the sample container, and calculates a concentration of the specific radionuclide from γ-ray data per each unit time detected by the γ-ray detector and a volume of the subject measurement medium introduced into the sample container; and
   an analysis device which detects a concentration of hydrogen or oxygen included in the subject measurement medium; and
   a volume control tank which separates a nuclear reactor coolant into a liquid phase and a gas phase, wherein
   the sample container is connected to the volume control tank via a gas phase sampling point and obtains the subject measurement medium from the gas phase in the volume control tank.

2. The nuclear reactor fuel integrity monitor according to claim 1, wherein
   the sample container is formed in a hollow shape and is wound on the γ-ray detector so as to surround the γ-ray detector in a spiral shape.

3. The nuclear reactor fuel integrity monitor according to claim 2, wherein
   the subject measurement medium is a gas and the specific radionuclide is radioxenon.

* * * * *